G. P. WERN.
SCREW OPERATED LEVER.
APPLICATION FILED FEB. 26, 1912.
1,070,931.
Patented Aug. 19, 1913.
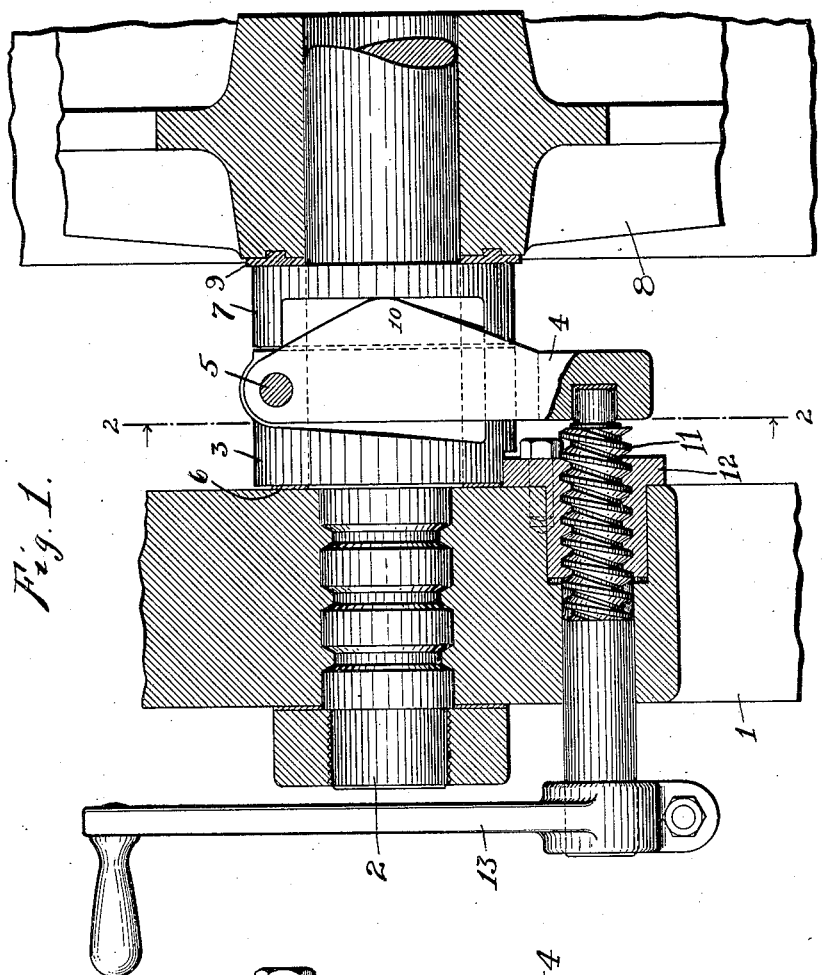
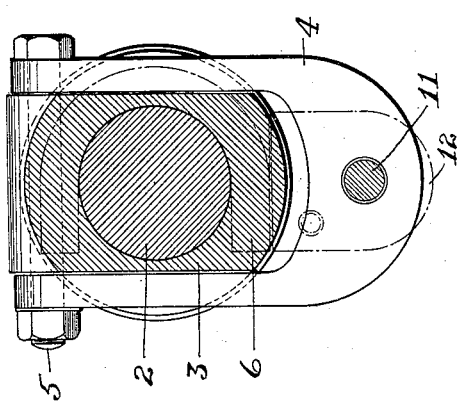
WITNESSES:
INVENTOR.
Gustav P. Wern,
BY Lewis J. Doolittle
ATTORNEY.

UNITED STATES PATENT OFFICE.

GUSTAV P. WERN, OF NEW YORK, N. Y.

SCREW-OPERATED LEVER.

1,070,931.  Specification of Letters Patent.  Patented Aug. 19, 1913.

Application filed February 26, 1912. Serial No. 680,066.

*To all whom it may concern:*

Be it known that I, GUSTAV P. WERN, a citizen of the United States, and resident of the city, county, and State of New York, have invented certain new and useful Improvements in Screw-Operated Levers, of which the following is a specification.

This invention relates to a friction screw for operating a clutch or other mechanism.

The object of the invention is to provide a self-contained friction screw arrangement of a simple and compact construction which is fulcrumed upon a support carried by the shaft and also to provide for holding the parts from rotating.

A further object of the invention is to provide a simple means of adjustment and for taking up the wear, which may be inserted without taking the machine apart.

In carrying out the invention a fork or yoke is fulcrumed upon a collar or support carried upon the shaft. A friction pressure collar is also positioned upon the shaft and arranged to be operated by the movement of the fork or yoke, which is also provided with means for holding the same from revolving. A friction screw is provided for operating the fork or yoke and also means for adjusting the several parts, all of which will be explained more fully hereinafter in connection with the description of the invention shown in the accompanying drawings.

In the drawings like parts in the several views have been given the same reference numerals.

Figure 1 is a sectional side elevation of a portion of the machine embodying the invention. Fig. 2 is a sectional end view on the line 2—2, looking in the direction of the arrows.

At 1 is shown a portion of the frame of the machine in which one end of the shaft 2 is journaled in suitable thrust bearings. A support or collar 3 is carried upon the shaft 2, but is held against rotation therewith by the yoke 4 which is pivotally attached or fulcrumed upon the support 3 at the point 5. The support 3 is provided with flattened portions on either side thereof and these flattened sides are embraced by the yoke 4, as shown in the drawings. An adjusting member 6 is positioned between the support 3 and the frame 1. This adjusting member 6 may be U-shaped so that the same may be readily placed in position and it will be understood that members of different thicknesses or several members may be used as required to take up wear and to bring the parts into proper operative position. A friction collar 7 is also positioned upon the shaft 2 and operates a clutch or other mechanism of the machine indicated at 8. Between the friction collar 7 and the clutch 8 friction members 9 may be positioned. These members may be semi-circular in form and provided with projecting tongues entering corresponding recesses in the clutch member 8, as shown, for the purpose of holding the same in position. The friction collar 7 is provided with flattened portions on either side thereof which are embraced by the ears or projections 10 upon the yoke 4. These ears or projections 10 are preferably tapered in form as shown and provided with a rounded end which engages the shoulders formed on either side of the friction collar 7 by the flattened portions above described.

A friction screw 11 is mounted in the frame 1 and provided with a suitable removable bearing 12 and with an operating handle 13 at its outer end. The inner end of the friction screw 11 enters a recess in the yoke 4 at the end opposite the pivot 5, as shown in the drawings. The handle 13 is adjustably mounted upon and secured to a friction screw 11 so that the same may be moved to enable it to be brought to the same position for the "off" or "on" positions of the clutch.

The bearing 12 is provided with a flange which is flat at its upper side and is so positioned as to engage a flattened portion of the collar 3 and also to engage the straight side of the washers 6, thereby holding the same from rotating, as will be understood by reference to the drawings.

It will thus be seen that a self contained friction screw arrangement is provided in which the fulcrum of the yoke is brought as near as possible to the shaft so as to increase the leverage. It will also be seen that the parts are all held from revolving and that the same may be assembled or adjusted in a very simple manner.

When the handle 13 is turned the screw 11 moves the yoke 4 about its pivot 5, which movement is transmitted by the friction collar 7 to the clutch 8. It will also be understood that the clutch 8 is merely illustrative of any part of the machine or mechanism which it is desired to operate.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In a device of the character described, in combination with the shaft, a support carried by said shaft, a pressure collar carried by said shaft and movable longitudinally thereupon, said collar and support being cut away at their sides to form flat-bottomed recesses, a flat lever pivoted to said support and lying in said recesses, said lever having a projection thereon adapted to engage the end wall of the recess on said pressure collar, and a screw positioned to engage the free end of said lever.

2. In a device of the character described, in combination with the shaft, a support carried by said shaft, a pressure collar supported for longitudinal movement on said shaft, said collar and support being cut away at their sides forming a recess and a shoulder, a lever pivoted to said support and lying in said recess, said lever having a projection thereon adapted to engage said shoulder to move said pressure collar and a screw positioned to engage the free end of said lever.

Signed at New York city, in the county and State of New York, this 20th day of February, 1912.

GUST. P. WERN.

Witnesses:
LEWIS J. DOOLITTLE,
RUTH WILLINSKY.

---

Copies of this patent may be obtained for five cents each, by addressing the "Commissioner of Patents, Washington, D. C."